(12) United States Patent
Jennen (10) Patent No.: US 7,430,346 B2
(45) Date of Patent: Sep. 30, 2008

(54) NON-BLOCKING CYCLIC AWG-BASED NODE ARCHITECTURES

(75) Inventor: Jean Gerardus Leonardus Jennen, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 48 days.

(21) Appl. No.: 11/218,200

(22) Filed: Sep. 1, 2005

(65) Prior Publication Data

US 2007/0098319 A1 May 3, 2007

(51) Int. Cl.
*H04J 14/02* (2006.01)
*G02B 6/42* (2006.01)

(52) U.S. Cl. .......................................... 385/17; 398/50

(58) Field of Classification Search .................. 385/17; 398/50
See application file for complete search history.

(56) References Cited

U.S. PATENT DOCUMENTS 5,870,216 A * 2/1999 Brock et al. ................... 398/49
6,317,529 B1 * 11/2001 Kashima ....................... 385/16
6,829,401 B2 * 12/2004 Duelk et al. .................. 385/16
2003/0133641 A1 7/2003 Ben
2003/0206684 A1 11/2003 Tetsuya et al.
2004/0165816 A1 * 8/2004 Oikawa et al. ................ 385/17

FOREIGN PATENT DOCUMENTS

EP 1 182 905 A 2/2002
EP 05 25 5353 2/2006

OTHER PUBLICATIONS

S. Bregni et al, "Architectures and Performance of AWG-Based Optical Switching Nodes for IP Networks," IEEE J. on Selected Areas in Communications, vol. 21, No. 7 Sep. 2003, pp. 1113-1121.

* cited by examiner

*Primary Examiner*—Sung Pak
*Assistant Examiner*—Jerry Rahll (57) ABSTRACT

An optical switching architecture utilizing a multiple stage configuration of wavelength division multiplexed (WDM) component wavelength converters and cyclic arrayed waveguide grating (AWG) router.

8 Claims, 5 Drawing Sheets

NON-BLOCKING CYCLIC AWG-BASED NODE ARCHITECTURES

FIELD OF THE INVENTION

The invention is related to the field of optical telecommunications, and in particular, to optical switching architectures.

BACKGROUND OF THE INVENTION

Today's optical communications networks carry large amount of information over long distances. Many optical communications network cross-connect architectures are inefficient. Unfortunately, they exhibit poor scalability, exhibit internal blocking, and/or require tunable lasers with wavelength range beyond the input wavelengths.

SUMMARY

Various deficiencies of the prior art are addressed by the present invention of an optical switching architecture utilizing a multiple stage configuration of wavelength division multiplexed (WDM) component wavelength converters and cyclic arrayed waveguide grating (AWG) routers.

In one embodiment, an optical switching apparatus comprises a first stage, for selectively adapting component channel wavelengths of N received wavelength division multiplexed (WDM) optical signals to provide thereby N first processed WDM optical signals, where N is an integer; a first N×N cyclic arrayed waveguide grating (AWG), for cyclically routing component channel wavelengths of the N first processed WDM optical signals to provide thereby N first routed WDM optical signals; a second stage, for selectively adapting component channel wavelengths of the N first routed WDM optical signals to provide thereby N second processed WDM optical signals; and a second N×N cyclic AWG, for cyclically routing component channel wavelengths of the N second processed WDM optical signals to provide thereby N second routed WDM optical signals; wherein the first and second stage adaptation of component channel wavelengths operates to cause a desired routing of optical data.

Another embodiment of the invention provides for strictly non-blocking cross-connection of optical signals including a first stage including N tuner modules having N inputs and 2N outputs, wherein N is an integer. A first N×N cyclic arrayed waveguide grating (AWG) having input ports coupled to the first stage and output ports. A second N×N cyclic AWG having input ports coupled to the first stage and output ports. A second stage including 2N tuner modules, each tuner module comprising an input coupled to the output ports of the first and second cyclic N×N cyclic AWGs and two outputs wherein the first output is connected to a third N×N cyclic AWG and the second output is connected to a fourth N×N cyclic AWG. The third and fourth N×N cyclic AWGs have output ports. Third stage comprising N combiner modules, each combiner module includes one output and two inputs wherein one of the inputs is connected to the output ports of the third N×N cyclic AWG and the other input is connected to the fourth AWG.

Another embodiment includes two 2N×2N cyclic AWGs instead of using four N×N cyclic AWGs.

The invention further provides other methods and system elements that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of non-blocking cyclic arrayed waveguide grating (AWG) node architecture; however, those skilled in the art and informed by the teachings herein will realize that the invention is also applicable to any apparatus and method that involves cross-connections of optical signals in a communications network.

Figure 1:
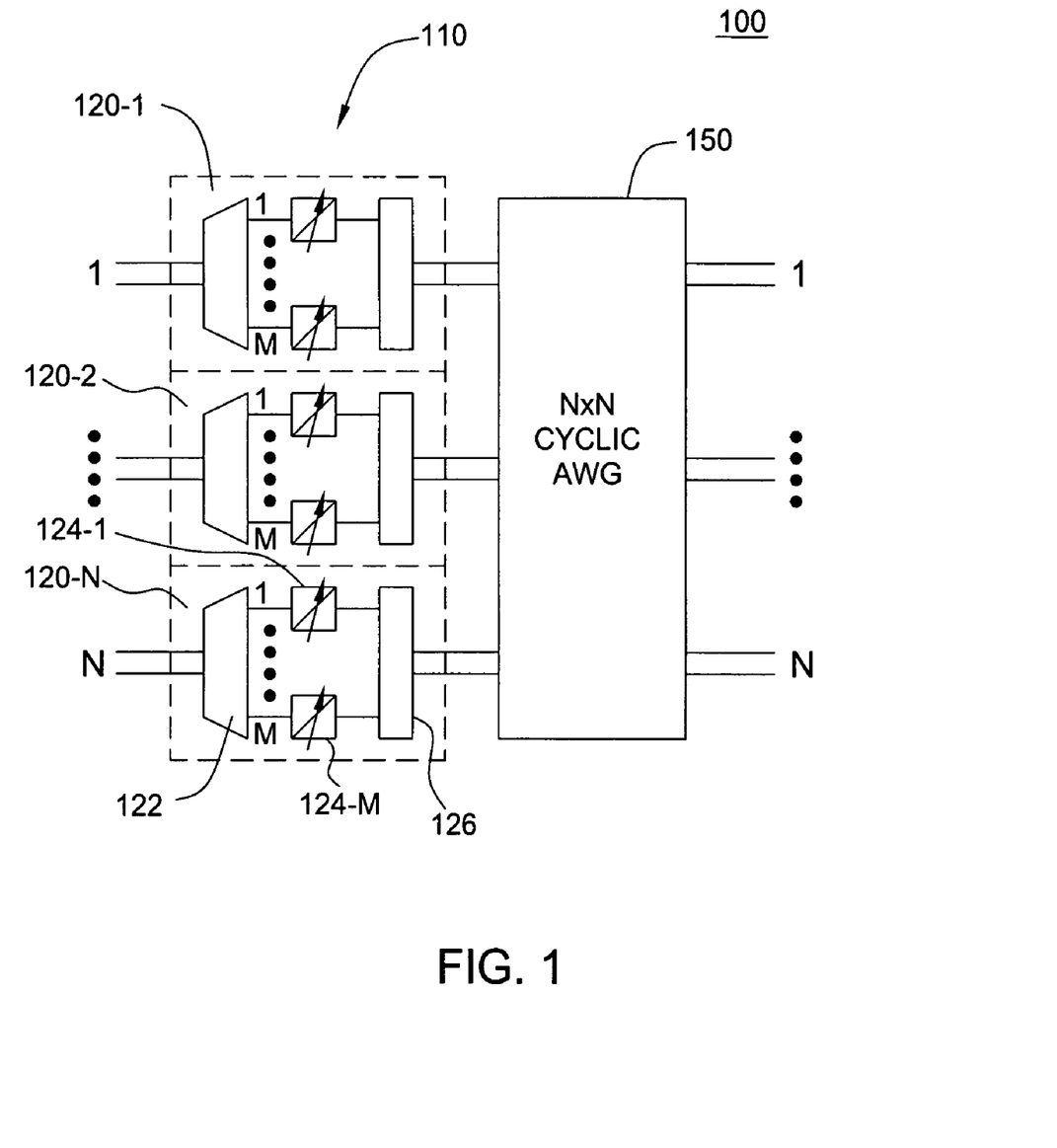
FIG. 1 depicts a block diagram of scalable optical switching architecture.

FIG. 1 depicts a block diagram of scalable optical switching architecture 100. The switching architecture 100 of FIG. 1 comprises a first stage 110 for pre-processing received optical signals and an N×N cyclic arrayed waveguide grating (AWG) 150 for cyclically switching the pre-processed optical signals. The switching architecture 100 comprises an N×N switching architecture in which information provided via any component wavelength or channel of any of N received Wavelength Division Multiplexed (WDM) input signals may be routed to any of N WDM output signals.

The first stage 110 comprises N tuner modules denoted as tuner modules 120-1 through 120-N (collectively tuner modules 120), where N is an integer greater than one. Each of the N tuner modules 120 is adapted to receive a respective one of N WDM signals. Each of the N WDM signals includes a plurality of component optical signals having respective wavelengths, illustratively M component optical signals operating at respective wavelengths, denoted as wavelengths $\lambda_1$ through $\lambda_M$. Each of the M wavelengths represents a channel within the WDM signal; therefore, M is an integer equal to the number of channels in the WDM signal. In one embodiment, the number of wavelengths M supported in each of the tuner modules 120 is selected as an integer multiple of N. Other selections of M may be utilized.

Each of the N tuner modules 120 comprises a demultiplexer 122, a plurality (illustratively M) of tunable wavelength converters 124-1 to 124-M (collectively wavelength converters 124) and a combiner 126. For each of the N tuner modules 120, the wavelength demultiplexer 122 separates its received WDM input signal into a plurality of component wavelengths or channels (illustratively wavelengths $\lambda_1$ through $\lambda_M$). Each of the M demultiplexed wavelengths or channels is selectively processed by a respective one of the M wavelength converters 124.

The tunable wavelength converters 124 operate to convert information bearing optical signal of one wavelength into information bearing optical signal of the same or another wavelength. That is, each tunable wavelength converter 124 receives a respective input optical signal of a first wavelength and provides an output optical signal of the first wavelength (i.e., no conversion) or one of the other M wavelengths. The tunable wavelength converter 124 may be implemented using any optical component that converts the wavelength of an optical signal used to carry a payload.

The combiner 126 operates to combine all of the output optical signals from the wavelength converters 124 into a new WDM optical signal. It is noted that the conversion process is controlled such that the optical signals received by the combiner 126 have different wavelengths. The output of the combiners 126 of the N tuner modules 120 is communicated to a corresponding one of N input ports of the N×N cyclic AWG 150.

The N×N cyclic AWG 150 comprises N input ports and N output ports. Optical signals are routed from the input ports to the output ports according to wavelength. Thus, by adapting (via pre-processing) WDM component signal wavelengths the routing of the information associated with the component signals through the N×N cyclic AWG 150 is changed.

The N×N cyclic AWG 150 distributes the wavelengths at any AWG input port over the N output ports in a cyclic manner. For example, if there are 3 input ports and 3 output ports (i.e., N=3) and there are 12 channels on the WDM signal (i.e., M=12), then each wavelength will be switched cyclically as described, for example, in Table 1. That is, for the WDM signal that is communicated to input port 1 of the AWG, the first wavelength of the WDM signal will be switched to output port 1, the second wavelength will be switched to output port 2, the third wavelength will be switched to output port 3, the fourth wavelength will be switched to output port 1 and so on. For the WDM signal that is communicated to input port 2 of the AWG, the first wavelength will be switched to output port 2, the second wavelength will be switched to output port 3, the third wavelength will be switched to output port 1, the fourth wavelength will be switched to output port 2 and so on. For the WDM signal that is communicated to input port 3 of the AWG, the first wavelength will be switched to output port 3, the second wavelength will be switched to output port 1, the third wavelength will be switching to output port 2, the fourth wavelength will be switched to output port 3 and so on.

Thus, any one of the component input wavelengths at any one of the input ports 1 to N of the first stage is capable of being switched to any output ports 1 to N of the AWG 150 by appropriate conversion of the corresponding wavelengths in the tuner modules 120.

TABLE 1

| | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ |
|---|---|---|---|---|---|---|---|---|---|---|---|---|
| Input port | 1 | 2 | 3 | 1 | 2 | 3 | 1 | 2 | 3 | 1 | 2 | 3 |
| | 2 | 3 | 1 | 2 | 3 | 1 | 2 | 3 | 1 | 2 | 3 | 1 |
| | 3 | 1 | 2 | 3 | 1 | 2 | 3 | 1 | 2 | 3 | 1 | 2 |

Figure 2:
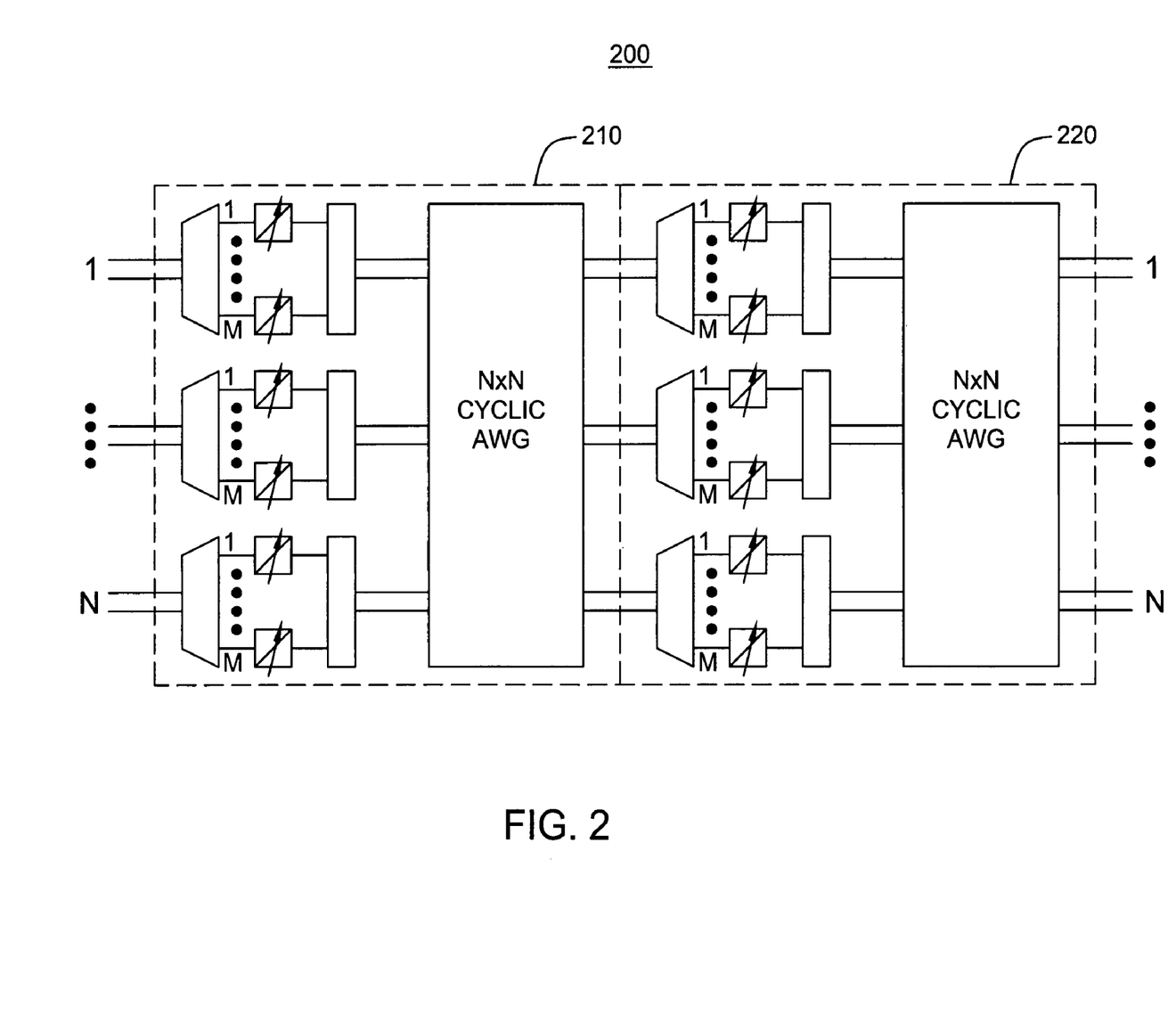
FIG. 2 depicts a block diagram of a rearrangeable non-blocking switching architecture according to an embodiment of the invention.

FIG. 2 depicts a block diagram of a rearrangeable non-blocking switching architecture 200 according to an embodiment of the invention. The embodiment of FIG. 2 is implemented by cascading two scalable optical switching architectures 100 discussed above with respect to FIG. 1. Thus, the embodiment 200 of FIG. 2 includes a first switching architecture 210 and a second switching architecture 220.

Each of the first 210 and second 220 switching architectures operates in substantially the same manner as described above with respect to the switching architecture 100 of FIG. 1. The N input ports of the second switching architecture 220 are connected to the respective N output ports of the first switching architecture 210 to form thereby the cascade architecture.

Referring to Table 1, it is noted that the AWG internal routing dictates that M/N wavelengths are available to reach any AWG output port from a given AWG input port. The M/N wavelengths from each AWG input port (1 . . . N) to reach the same AWG output port make up the total set of M different wavelengths. This means that when all ($\leq M$) signals with the same destination (1 . . . N) are equally spread over the N inputs of the second stage, a suitable wavelength mapping in the second tunable wavelength converter stage can always be found to assure appearance of all signals at the proper destination fiber.

For all permutations of assigned output destinations over the incoming N·M channels, it is possible to find a wavelength mapping in the first tunable wavelength converter stage such that at most M/N signals with the same destination appear at each intermediate port (i.e. the output of the switching architecture 210). Using the example with N=3 and M=12, such wavelength mapping can be illustrated by reference to Table 2, Table 3, and Table 4.

In this example, the WDM signals at the input ports have the source, destination, and source wavelength information as shown in Table 2. The wavelengths of the first tuner module 120 are assigned such that, at the output ports of the switching architecture 210, the WDM signals from the input ports will be tuned to have the information as shown in Table 3.

The WDM signals of the output ports of 210 will be tuned and switched by the switching architecture 220 according to Table 4. Thus, in this specific case, a solution exists where all the input WDM signals maybe routed to all the output ports of 200 without blocking.

Referring to Table 2, a first intermediate port processes signal from input port 1, $\lambda_1$-$\lambda_4$, input port 2, $\lambda_4$-$\lambda_7$, and input port 3, $\lambda_3$, $\lambda_4$, $\lambda_9$ and $\lambda_{10}$; a second intermediate port processes signal from input port 1, $\lambda_5$-$\lambda_8$, input port 2, $\lambda_9$-$\lambda_{12}$, and input port 3, $\lambda_1$, $\lambda_8$, $\lambda_{11}$ and $\lambda_{12}$; and a third intermediate port processes signal from input port 1, $\lambda_9$-$\lambda_{12}$, input port 2, $\lambda_1$-$\lambda_3$ and $\lambda_8$, and input port 3, $\lambda_2$ and $\lambda_5$-$\lambda_7$.

TABLE 2

| | | λ₁ | λ₂ | λ₃ | λ₄ | λ₅ | λ₆ | λ₇ | λ₈ | λ₉ | λ₁₀ | λ₁₁ | λ₁₂ |
|---|---|---|---|---|---|---|---|---|---|---|---|---|---|
| Input port | 1 | 1 1/3 | 1 2/2 | 1 3/2 | 1 4/1 | 1 5/1 | 1 6/3 | 1 7/3 | 1 8/2 | 1 9/1 | 1 10/3 | 1 11/2 | 1 12/2 |
| | 2 | 2 1/3 | 2 2/3 | 2 3/1 | 2 4/1 | 2 5/2 | 2 6/2 | 2 7/3 | 2 8/2 | 2 9/3 | 2 10/1 | 2 11/2 | 2 12/2 |
| | 3 | 3 1/3 | 3 2/3 | 3 3/3 | 3 4/3 | 3 5/2 | 3 6/2 | 3 7/1 | 3 8/2 | 3 9/1 | 3 10/1 | 3 11/1 | 3 12/1 |

| S | λₛ |
|---|---|
| D | |

S = Source fibre
D = Destination fibre
λₛ = Source wavelength

Referring to Table 3, the output of the first stage 210 (i.e., after a first wavelength conversion) of the embodiment of FIG. 2 is tabulated according to the example discussed with respect to Table 2. It is noted that the intermediate ports described with respect to Table 2 are still the same, though the pre-processing and routing of the first stage has modified the wavelengths associated with some of the information bearing input signals. The source fiber, destination fiber and source wavelength of the various signals denoted in Table 3 are processed by the same intermediate ports denoted above with respect to Table 2.

TABLE 3

| | | λ₁ | λ₂ | λ₃ | λ₄ | λ₅ | λ₆ | λ₇ | λ₈ | λ₉ | λ₁₀ | λ₁₁ | λ₁₂ |
|---|---|---|---|---|---|---|---|---|---|---|---|---|---|
| Stage 1 Output port | 1 | 1 1/3 | 3 3/3 | 2 4/1 | 1 2/2 | 3 4/3 | 2 5/2 | 1 3/2 | 3 9/2 | 2 6/1 | 1 4/1 | 3 10/1 | 2 7/3 |
| | 2 | 2 9/3 | 1 5/1 | 3 1/3 | 2 10/1 | 1 6/3 | 3 8/2 | 2 11/2 | 1 7/3 | 3 11/1 | 2 12/2 | 1 8/2 | 3 12/1 |
| | 3 | 3 2/3 | 2 3/3 | 1 9/1 | 3 5/2 | 2 2/3 | 1 10/3 | 3 6/2 | 2 3/1 | 1 11/2 | 3 7/1 | 2 3/2 | 1 12/2 |

Referring to Table 4, the output of the second stage 220 (i.e., after a second wavelength conversion) of the embodiment of FIG. 2 is tabulated according to the example discussed with respect to Tables 2 and 3. It is noted that the intermediate ports described with respect to Table 2 are still the same, though the pre-processing and routing of the first and second stages has modified the wavelengths associated with some of the information bearing input signals. The source fiber, destination fiber and source wavelength of the various signals denoted in Table 4 are processed by the same intermediate ports denoted above with respect to Table 2. It is noted that after second wavelength conversion (i.e., at the output of the second AWG stage 220) all optical information streams or bursts reach their correct destination ports.

TABLE 4

| | | λ₁ | λ₂ | λ₃ | λ₄ | λ₅ | λ₆ | λ₇ | λ₈ | λ₉ | λ₁₀ | λ₁₁ | λ₁₂ |
|---|---|---|---|---|---|---|---|---|---|---|---|---|---|
| Stage 2 Output port | 1 | 1 2/1 | 4 3/1 | 7 2/10 | 3 9/1 | 2 3/1 | 1 5/1 | 3 10/1 | 2 3/1 | 3 11/1 | 1 4/1 | 1 9/1 | 3 12/1 |
| | 2 | 2 2/11 | 2 5/2 | 3 5/2 | 2 12/2 | 2 6/2 | 3 6/2 | 1 8/2 | 1 2/2 | 1 11/2 | 3 8/2 | 1 3/2 | 1 12/2 |
| | 3 | 3 3/3 | 2 9/3 | 2 7/3 | 2 3/3 | 3 1/3 | 3 3/3 | 2 2/3 | 1 6/3 | 3 4/3 | 1 10/3 | 1 7/3 | 1 1/3 |

The proof of the above operation may be further explored by examining a situation in which that all input channels are to be directed to a destination port. The existence of a non-blocking solution for every permutation in this case also implies that a non-blocking solution exists when one or more input channels remain idle; simply remove connections from a solution at full capacity. So, each input port i, i∈[1,N], contains M channels with destination port numbers $d_{i,m}$, m∈[1,M], $d_{i,m}$∈[1,N]. Each destination port appears M times within the entire set $\{d_{i,m}\}$.

Applying Hall's marriage theorem, it is possible to find a system of distinct representatives $\{x_i\}$ with $x_1 \in \{d_{1,m}\}$, $x_2 \in \{d_{2,m}\}$, ... $x_N \in \{d_{N,m}\}$ such that $x_i \neq x_j$ whenever i≠j. This is the case when for any k, 1≤k≤N, input ports at least k different destinations are contained within the k·M associated destination ports. According to the pigeonhole principle, at least ⌈# of destinations/max # of occurrences per destinations⌉=⌈k·M/M⌉=k different destinations are indeed observed. Hence, N input channels, one from each input port, can be assigned having N different destinations to the same intermediate port.

The remaining M−1 channels per input port are to be connected to still N different destination ports each appearing M−1 times within the entire set $\{d_{i,m'}\}$, m'∈[1,M−1], $d_{i,m'}$∈[1,N], after the renumbering of the remaining channels. Again, according to Hall's marriage theorem, N input channels, one from each input port, can be selected having N different destinations. Repeating this procedure M times in total provides us M sets of N different destination port numbers each. Combination of any M/N such sets can therefore be assigned to the same intermediate port satisfying the condition that at most M/N signals with the same destination appear at that port. So, proof is given for the (rearrangeable) non-blocking nature of the proposed architecture.

The preceding paragraphs describe a rearrangeable non-blocking optical burst switching (OBS) node architecture for non-contending traffic at the fiber level. However, this architecture does not allow for an arbitrary selection of any available wavelength at the desired destination port. For instance, when in the above example (N=3, M=12) four incoming signals at input 1 are bound for output 1 at wavelengths $\lambda_1, \lambda_4, \lambda_7,$ and $\lambda_{10}$ while simultaneously another signal at input 1 is bound for output 2 at $\lambda_5$, one of these five channels will be blocked as they all would have to be directed to intermediate port 1. To achieve non-blocking at the wavelength level as well, addition of a third tunable wavelength converter stage is included in order to provide the means to obtain any wavelength permutation of the outbound signals at each output port. The resulting node architecture is depicted in FIG. 3.

Figure 3:
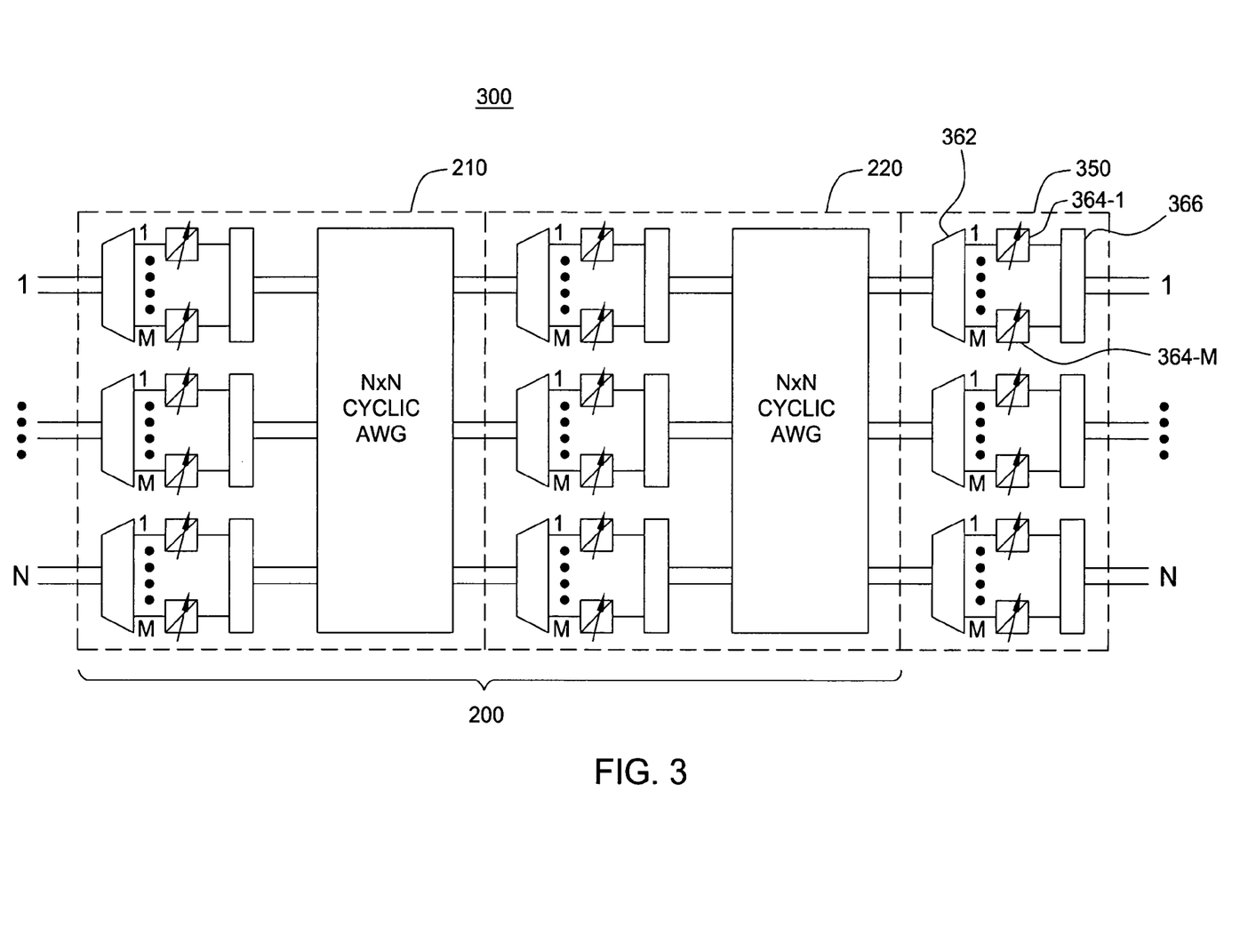
FIG. 3 depicts a block diagram of another rearrangeable non-blocking switching architecture according to an embodiment of the invention.

FIG. 3 depicts a block diagram of a rearrangeable non-blocking switching architecture 300 according to an embodiment of the invention. The embodiment of FIG. 3 is implemented by adapting the architecture 200 of FIG. 2 to include a final stage of tuner modules 350 connected to the output portion of the second switching architecture 200.

The output tuner module stage 350 operates in substantially the same manner as described above with respect to the various pre-processing stage 110 of FIG. 1. Specifically, each one of the final stage output tuner modules (collectively output tuner modules 350) includes a respective wavelength demultiplexer 362 that separates each respective output signal from the second switching architecture 220 into M different wavelengths, where M represent the number of channels in the WDM signal. In one embodiment, the number of wavelengths supported in the tuner modules of switching architecture 220 must also equal N·⌈M/N⌉ in order to assure the non-blocking operation of the switching architecture 300. Thus, when M is an integer multiple of N an optimized solution is reached in terms of the number of required wavelength converters per incoming wavelength. Each one of the M wavelengths is independently tuned by a respective tunable wavelength converter (364-1 to 364-M) to provide thereby M converted optical signals, which optical signals are then recombined by the combiner 366 to form a combined output signal of the rearrangeable non-blocking architecture 300. In this manner, the information conveyed via the channels of the WDM signal is arranged before the WDM signal is transmitted into the network with the information routed to the correct output port on the desired wavelength.

Figure 4:
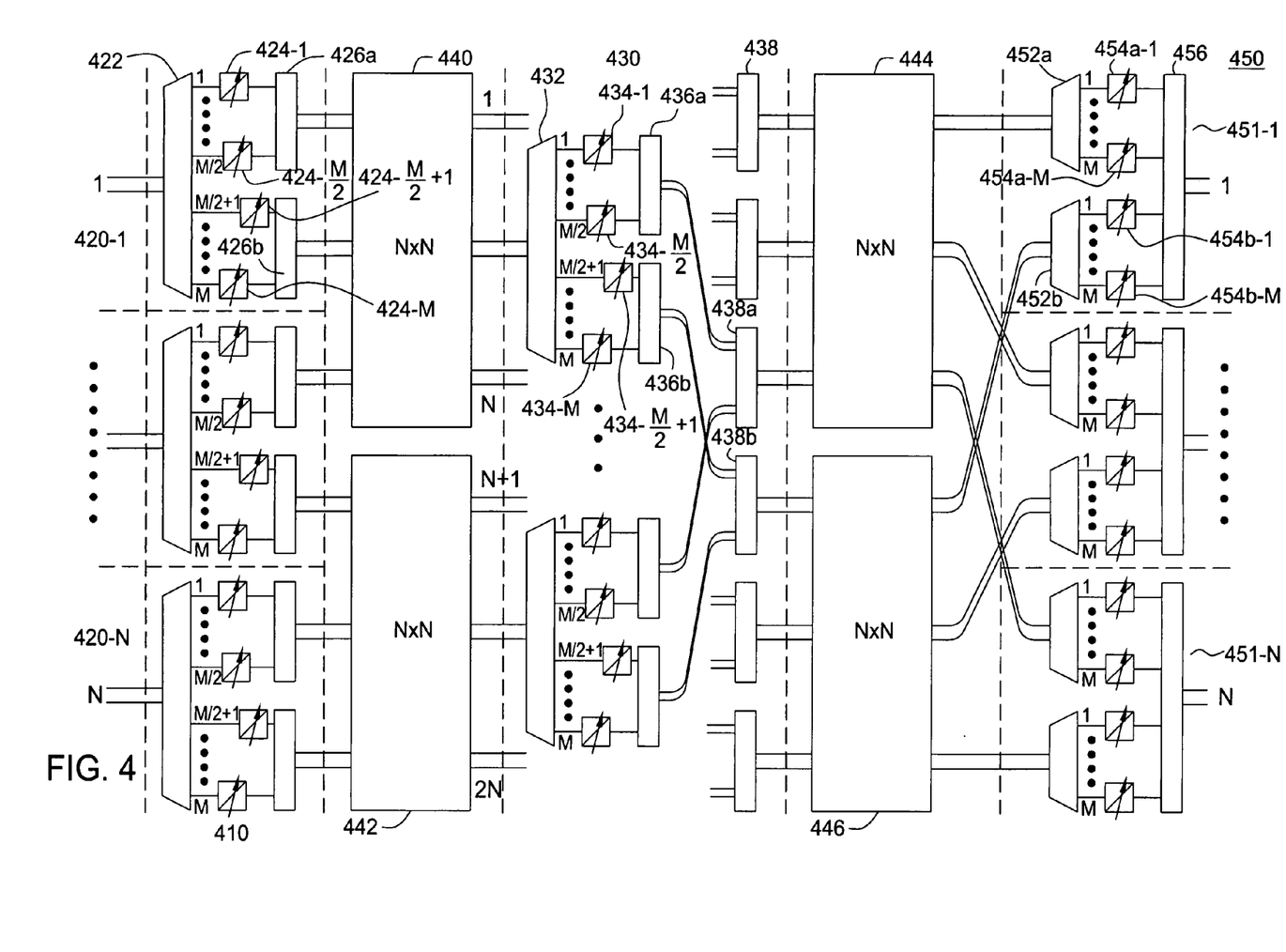
FIG. 4 depicts a block diagram of a strictly non-blocking switching architecture according to an embodiment of the invention.

FIG. 4 depicts a block diagram of a strictly non-blocking switching architecture 400 according to an embodiment of the invention. The switching architecture 400 receives N input WDM signals and selectively switches the N inputted WDM signals to N output WDM signals without any internal blocking. In this embodiment, the architecture has a first stage 410, a first N×N cyclic AWG 440, a second N×N cyclic AWG 442, a second stage 430, a third N×N cyclic AWG 444, a fourth N×N cyclic AWG 446, and an output combiner stage 450.

Illustratively, the first stage 410 receives N WDM input signals via respective ones of the respective N optical fibers, where N is an integer greater than 1. Each of the optical fibers 1 to N is respectively connected to a corresponding tuner module (420-1 to 420-N). In this embodiment, each corresponding tuner module (420-1 to 420-N) includes a wavelength demultiplexer 422 that separates its received WDM input signal into M different wavelengths. Each one of the M wavelengths is independently tuned by its respective tunable wavelength converter (424-1 to 424-M) to provide M tuned optical signals. The tuned optical signals from converters 424-1 to 424-(M/2) are recombined by a respective upper combiner 426a. The recombined optical signal from the upper combiner 426a is transmitted to the first N×N cyclic AWG 440. The wavelengths tuned by converters 424-M/2+1 to 424-M are recombined by a respective lower combiner 426b. The recombined optical signal at the lower combiner 426b is transmitted to the second N×N cyclic AWG 442. In an alternative embodiment, a crossover arrangement (not shown) should be used where every other converter (424-2, 424-4 . . . 424-M) will transmit to the first AWG 440 while the rest of the converters (424-1, 424-4 . . . 424-(M−1)) will transmit to the second AWG 442.

The first N×N cyclic AWG 440 communicatively receives the WDM signals from half of the outputs of the first stage. The first AWG 440 distributes the wavelengths at any of its input ports over its N output ports in a cyclic manner. Each input port receives a corresponding recombined output signal from a respective output port of the first stage. The communicated output signal may be from the upper combiners, lower combiners, or any combination of upper and lower combiners.

The second N×N cyclic AWG 442 communicatively receives the WDM signals from the other half of the output ports of the first stage that are not communicatively coupled to the first AWG 440. The second AWG 442 distributes the wavelengths at any of its input ports over its N output ports in a cyclic manner. Each one of the N input ports communicatively receives a corresponding recombined output signal from the respective output port of the first stage. The received recombined output signal may be from the upper combiners, lower combiners, or any combination of upper and lower combiners. The second AWG 442 receives the respective optical signals and selectively switches them to any of the desired outputs (N+1 to 2N).

There are 2N tuner modules in the second stage 430. Each one of the output ports of both the first and second N×N cyclic AWGs (440, 442) communicates with its respective tuner module in the second stage 430. Each one of the tuner modules of the second stage 430 includes a respective wavelength demultiplexer 432 that separates the WDM signal received from the respective AWG (440 or 442) into M different wavelengths. Each one of the M wavelengths is independently tuned by a respective tunable wavelength converter (434-1 to 434-M) to provide M tuned optical signals. The wavelengths tuned by converters 434-1 to 434-M/2 are recombined by a respective upper combiner 436a. The recombined optical signal from the upper combiner 436a is transmitted to a respective upper output combiner 438a that is further transmitted to the third N×N cyclic AWG 444. The wavelengths tuned by converters 424-M/2+1 to 424-M are recombined by a respective lower combiner 436b. The recombined optical signal at the respective lower combiner 436b is transmitted to a respective lower output combiner 438b that is further transmitted to the fourth N×N cyclic AWG 446.

The third N×N cyclic AWG 444 communicatively receives all the optical signals from the outputs of the second stage from the upper output combiners 438a. The third AWG 444 distributes the wavelengths at any of its input ports over its N output ports in a cyclic manner. Each one of the input ports communicatively receives a corresponding recombined output signal from its respective output port of the upper output combiner 438a. The third AWG 444 selectively couples the optical signals and outputs the optical signals at the desired outputs 1 to N.

The fourth N×N cyclic AWG 446 communicatively receives its optical signals which are combined by the respective lower output combiners 438b. The fourth AWG 446 distributes the wavelengths at any of its input ports over its N output ports in a cyclic manner. Each one of the N input ports communicatively receives its recombined output signal from the respective lower output combiner 438b. The fourth AWG 446 selectively communicates its optical signals at the desired outputs (N+1 to 2N).

The output combiner stage 450 has N output combiners (451-1 to 451-N). Each one of the output combiners includes a respective first wavelength demultiplexer 452a communicatively coupled to the third AWG 444 and a respective second wavelength demultiplexer 452b communicatively coupled to the fourth AWG 446. Each one of the first wavelength demultiplexer 452a receives an optical signal from the third AWG 444 and separates the received optical signal into M different wavelengths. Each of those M wavelengths is passed through a respective tunable wavelength converter (454a-1 to 454a-M). Each one of the second wavelength demultiplexer 452b communicatively receives a respective optical signal from the fourth AWG 446. Each one of the second wavelength demultiplexer 452b separates its respective optical signals into M wavelengths. Each one of the M wavelengths is passed through a respective tunable wavelength converter (454b-1 to 454b-M). All the outputs from the respective converters 454a-1 to 454a-M and 454b-1 to 454b-M are combined by the combiner 456. Each one of the respective combiners 456 has one output port which functions as one of the respective N output ports of switching architecture 400.

Figure 5:
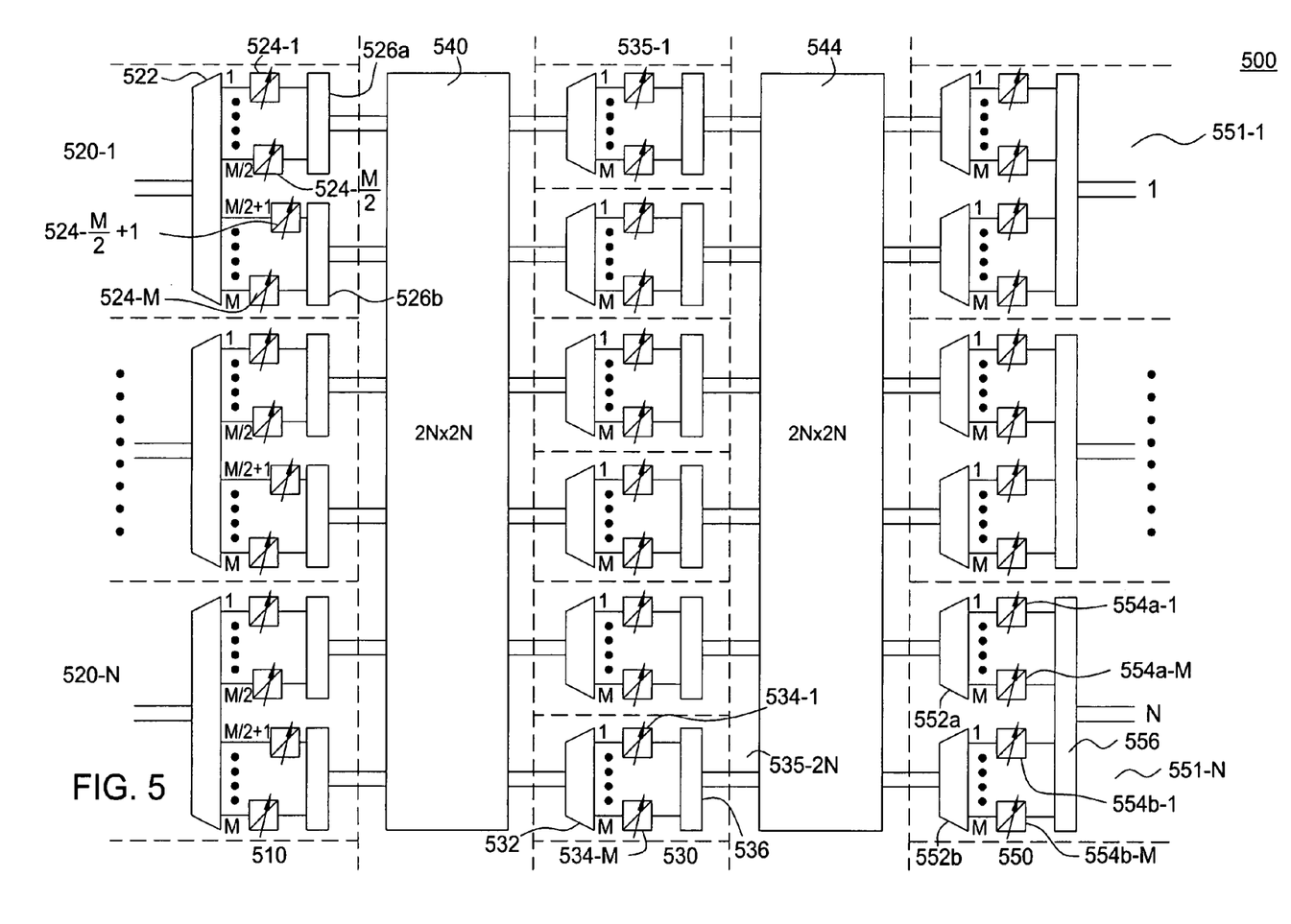
FIG. 5 depicts a flow diagram of another strictly non-blocking switching architecture according to an embodiment of the invention.

FIG. 5 depicts a flow diagram of another strictly non-blocking switching architecture 500 according to an embodiment of the invention. The architecture 500 includes a first stage 510, a first 2N×2N cyclic AWG 540, a second stage 530, a second 2N×2N cyclic AWG 544, and a third stage 550.

The first stage 510 has N input ports, each one of the N input ports communicates with one of the respective N optical fibers, where N is an integer greater than 1. Each one of the optical fibers carries, illustratively, a WDM optical signal. Each one of the respective fibers (1 to N) is communicatively coupled to a respective tuner module 520-1 to 520-N. Each one of the tuner modules 520-1 to 520-N includes a respective wavelength demultiplexer 522 that separates its received WDM signal into M different wavelengths, where M represent the number of channels in the WDM optical signal. M can be any integer. In one embodiment, the number of wavelengths supported in each of the tuner modules 520-1 to 520-N has to equal 2N·⌈M/2N⌉ in order to assure the non-blocking operation of the switching architecture 500. Thus, when M is an integer multiple of N an optimized solution is reached in terms of the number of required wavelength converters per incoming wavelength. Each one of the M wavelengths is independently tuned by a respective tunable wavelength converter 524-1 to 524-M to provide M tuned optical signals. The optical signals tuned by the respective converters 524-1 to 524-M/2 are recombined by a respective upper combiner 526a. The optical signals tuned by converters 524-M/2+1 to converter 524-M are recombined by a respective lower combiner 526b. The recombined optical signals produced by the respective upper and lower combiners are transmitted to the first 2N×2N cyclic AWG 540.

The first 2N×2N cyclic AWG 540 communicatively receives the WDM signals from the first stage. The first AWG 450 distributes the wavelengths at any of its input ports over its 2N output ports in a cyclic manner. Each one of the input ports receives a respective optical signal from the corresponding output port of the first stage 510. The respective output signals are transmitted from the respective upper combiners 526a and lower combiners 526b. The first AWG 540 selectively switches respective optical signals at any desired output ports (1 to 2N).

Each one of the output ports of the first 2N×2N cyclic AWG is communicatively coupled to a respective 2N tuner modules (535-1 to 535-2N) in the second stage 530. Each one of the respective tuner modules of the second stage 530 includes a respective wavelength demultiplexer 532 that separates its input signal into M different wavelengths, or the next higher integer multiple of 2N to ensure non-blocking operation of the switching architecture. Each one of the M wavelengths is independently tuned by a respective tunable wavelength converter (534-1 to 534-M) to provide M tuned optical signals. The wavelengths tuned by respective converters (534-1 to 534-M) are recombined by a respective combiner 536. The recombined optical signal from the respective combiner 536 is transmitted to the second 2N×2N cyclic AWG 544.

The second 2N×2N cyclic AWG 544 receives all the WDM optical signals from the outputs of the second stage 530. The second AWG 544 distributes the wavelengths at any of its input ports over its 2N output ports in a cyclic manner. Each one of the 2N input ports receives a corresponding output signal from the respective combiner 536 of the second stage 530. The second 2N×2N AWG 544 selectively outputs the WDM optical signals at any desired outputs (1 to 2N).

The output combiner stage 550 receives the output signals from the second 2N×2N AWG 554 and outputs the optical signals as the output of the switching architecture. The output combiner stage 550 includes N output combiners 551-1 to 551-N. Each one of the output combiners includes a respective first wavelength demultiplexer 552a and a respective second wavelength demultiplexer 552b. The first demultiplexer 552a and second demultiplexer 552b receive the optical signals from the second AWG 544 and optically separate the received optical signals into M different wavelengths. Each one of the M wavelengths passes through a respective tunable wavelength converter (554a-1 to 554a-M and converters 554b-1 to 554b-M). All the outputs from the respective tunable wavelength converters 554a-1 to 554a-M and 554b-1 to 554b-M are combined by the combiner 556 and are transmitted from the third stage 550 of the architecture 500 as output of the strictly non-blocking switching architecture 500.

Thus, in an embodiment of the invention described above with respect to FIG. 2 provided an optical switching apparatus including a first stage, for selectively adapting component channel wavelengths of N received wavelength division multiplexed (WDM) optical signals to provide thereby N first processed WDM optical signals, where N is an integer; a first N×N cyclic arrayed waveguide grating (AWG), for cyclically routing component channel wavelengths of the N first processed WDM optical signals to provide thereby N first routed WDM optical signals; a second stage, for selectively adapting component channel wavelengths of the N first routed WDM optical signals to provide thereby N second processed WDM optical signals; and a second N×N cyclic AWG, for cyclically routing component channel wavelengths of the N second processed WDM optical signals to provide thereby N second routed WDM optical signals; wherein the first and second stage adaptation of component channel wavelengths operates to cause a desired routing of optical data.

The embodiment of FIG. 2 is adapted, in another embodiment described above with respect to FIG. 3 by adding a third stage, for selectively adapting component channel wavelengths of the N second routed WDM optical signals to provide thereby N third processed WDM optical signals.

The embodiment of FIG. 3 is adapted, in another embodiment in which the first stage includes N tuner modules, each of the N tuner modules providing two first processed WDM optical signals, the second of the first processed WDM optical signals being provided to a third N×N cyclic AWG; the second stage includes N tuner modules, each of the N tuner modules providing two second processed WDM optical signals, the second of the second processed WDM optical signals being provided to a fourth N×N cyclic AWG; and the third stage includes N combiner modules, each combiner module operative to combine corresponding WDM optical signals from the second and fourth N×N cyclic AWGs.

The embodiment of FIG. 3 is adapted, in another embodiment, by cross-connecting the output WDM optical signals of the second stage to the second and fourth N×N cyclic AWGs using multiple combiners, wherein the multiple combiners combine WDM optical signals in a predefined manner. This embodiment is further adapted by combining 2N output switched WDM optical signals after the third stage processing to provide N output WDM optical signals.

The embodiment of FIG. 3 is adapted, in another embodiment, by providing a first stage, for selectively adapting component channel wavelengths of N received wavelength division multiplexed (WDM) optical signals to provide thereby 2N first processed WDM optical signals, where N is an integer; a first pair of N×N cyclic arrayed waveguide gratings (AWG), for cyclically routing component channel wavelengths of the 2N first processed WDM optical signals to provide thereby 2N first routed WDM optical signals; a second stage, for selectively adapting component channel wavelengths of the 2N first routed WDM optical signals to provide thereby 2N second processed WDM optical signals; two WDM combiners, each for combining N second processed WDM optical signals from each of the two N×N cyclic AWGs to provide thereby two combined WDM optical signals; a second pair of N×N cyclic AWGs, each for cyclically routing component channel wavelengths of at least a respective combined WDM optical to provide thereby N second routed WDM optical signals; a third stage, for selectively adapting component channel wavelengths of the 2N second routed WDM optical signals to provide thereby 2N third processed WDM optical signals; and N combiners, for combining corresponding component wavelengths for each one of N WDM optical signals provided by said second pair of N×N cyclic AWGs.

The embodiment of FIG. 3 is adapted, in another embodiment, by providing a first stage, for selectively adapting component channel wavelengths of N received wavelength division multiplexed (WDM) optical signals to provide thereby 2N first processed WDM optical signals, where N is an integer; a first 2N×2N cyclic arrayed waveguide grating (AWG), for cyclically routing component channel wavelengths of the N first processed WDM optical signals to provide thereby N first routed WDM optical signals; a second stage, for selectively adapting component channel wavelengths of the 2N first routed WDM optical signals to provide thereby 2N second processed WDM optical signals; a second 2N×2N cyclic AWG, for cyclically routing component channel wavelengths of the N second processed WDM optical signals to provide thereby N second routed WDM optical signals; and a third stage, for selectively adapting component channel wavelengths of the 2N second routed WDM optical signals to provide thereby N third processed WDM optical signals; wherein the first, second and third stage adaptation of component channel wavelengths operates to cause a desired routing of optical data.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. An optical switching apparatus, comprising:
a first stage, for selectively adapting component channel wavelengths of N received wavelength division multiplexed (WDM) optical signals to provide thereby 2N first processed WDM optical signals, where N is an integer;
a first pair of N×N cyclic arrayed waveguide gratings (AWG), for cyclically routing component channel wavelengths of the 2N first processed WDM optical signals to provide thereby 2N first routed WDM optical signals;
a second stage, for selectively adapting component channel wavelengths of the 2N first routed WDM optical signals to provide thereby 2N second processed WDM optical signals;
2N WDM combiners, each for combining two second processed WDM optical signals that include one from each of the first pair of N×N cyclic AWGs to provide thereby a combined WDM optical signal;
a second pair of N×N cyclic AWGs, each for cyclically routing component channel wavelengths of at least a respective combined WDM optical signal to provide thereby N second routed WDM optical signals;
a third stage, for selectively adapting component channel wavelengths of the 2N second routed WDM optical signals to provide thereby 2N third processed WDM optical signals; and
N combiners, for combining corresponding component wavelengths for each one of N WDM optical signals provided by said second pair of N×N cyclic AWGs.

2. The apparatus of claim 1, wherein:
the first, second and third stages each comprises respective pluralities of tuner modules, each of the tuner modules adapted to processing one WDM optical signal, each of the tuner modules comprising:
a demultiplexer, for extracting component channels from the respective WDM optical signal;
a plurality of wavelength converters, for selectively changing component channels wavelengths; and
a combiner, for combining component channels to provide a processed WDM optical signal.

3. The apparatus of claim 2, wherein M wavelength converters are used, where M is an integer multiple of N.

4. The apparatus of claim 2, wherein $2N \cdot \lceil M/2N \rceil$ wavelength converters in the tuner modules of the second stage are used, where M can be any positive integer.

5. The apparatus of claim 4, wherein $2N \cdot \lceil M/2N \rceil$ wavelength converters in the tuner modules of the second stage are used, where M can be any positive integer.

6. An optical switching apparatus, comprising:
a first stage, for selectively adapting component channel wavelengths of N received wavelength division multiplexed (WDM) optical signals to provide thereby 2N first processed WDM optical signals, where N is an integer;
a first 2N×2N cyclic arrayed waveguide grating (AWG), for cyclically routing component channel wavelengths of the 2N first processed WDM optical signals to provide thereby 2N first routed WDM optical signals;
a second stage, for selectively adapting component channel wavelengths of the 2N first routed WDM optical signals to provide thereby 2N second processed WDM optical signals;
a second 2N×2N cyclic AWG, for cyclically routing component channel wavelengths of the 2N second processed WDM optical signals to provide thereby 2N second routed WDM optical signals; and
a third stage, comprising N process modules for selectively adapting component channel wavelengths of the 2N second routed WDM optical signals to provide thereby N third processed WDM optical signals; each of the N process modules having 2 demultiplexers for extracting component channels from two of the 2N second routed WDM optical signals, a plurality of wavelength converters for selectively changing wavelengths for the extracted component channels, and a combiner for combining outputs from the plurality of wavelength converters into one processed WDM signal;
wherein the first, second and third stage adaptation of component channel wavelengths operates to cause a desired routing of optical data.

7. The apparatus of claim 6, wherein:

the first and second stages each comprises respective pluralities of tuner modules, each of the tuner modules adapted to processing one WDM optical signal, each of the tuner modules comprising:

a demultiplexer, for extracting component channels from the respective WDM optical signal;

a plurality of wavelength converters, for selectively changing component channels wavelengths; and     a combiner, for combining component channels to provide a processed WDM optical signal.

8. The apparatus of claim 7, wherein M wavelength converters are used, where M is an integer multiple of N.

\* \* \* \* \*